May 26, 1925.
R. S. BLAIR
FENDER FOR VEHICLES
Filed Feb. 18, 1921
1,539,540
4 Sheets-Sheet 1
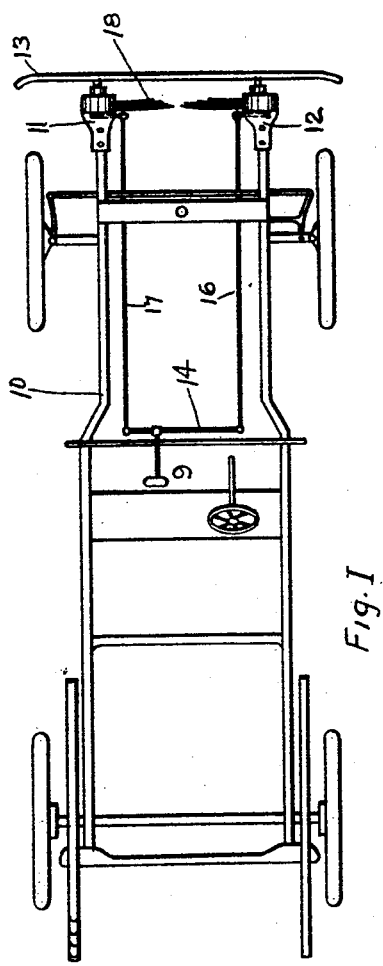
Fig. I
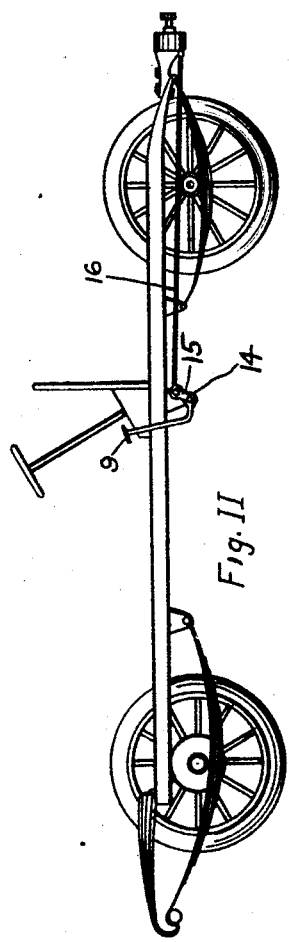
Fig. II
INVENTOR
Robert S. Blair.

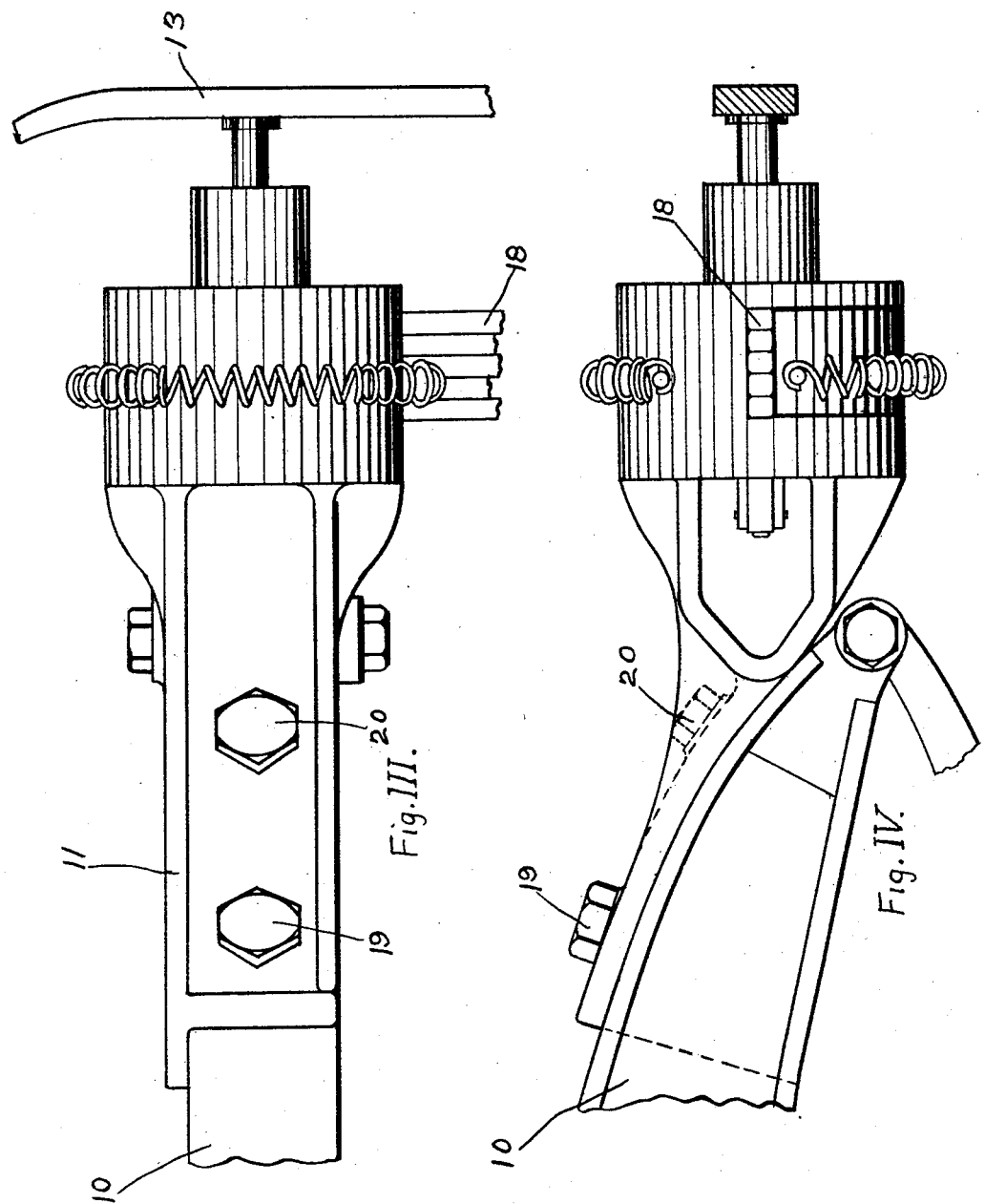

May 26, 1925.
R. S. BLAIR
1,539,540
FENDER FOR VEHICLES
Filed Feb. 18, 1921
4 Sheets-Sheet 3
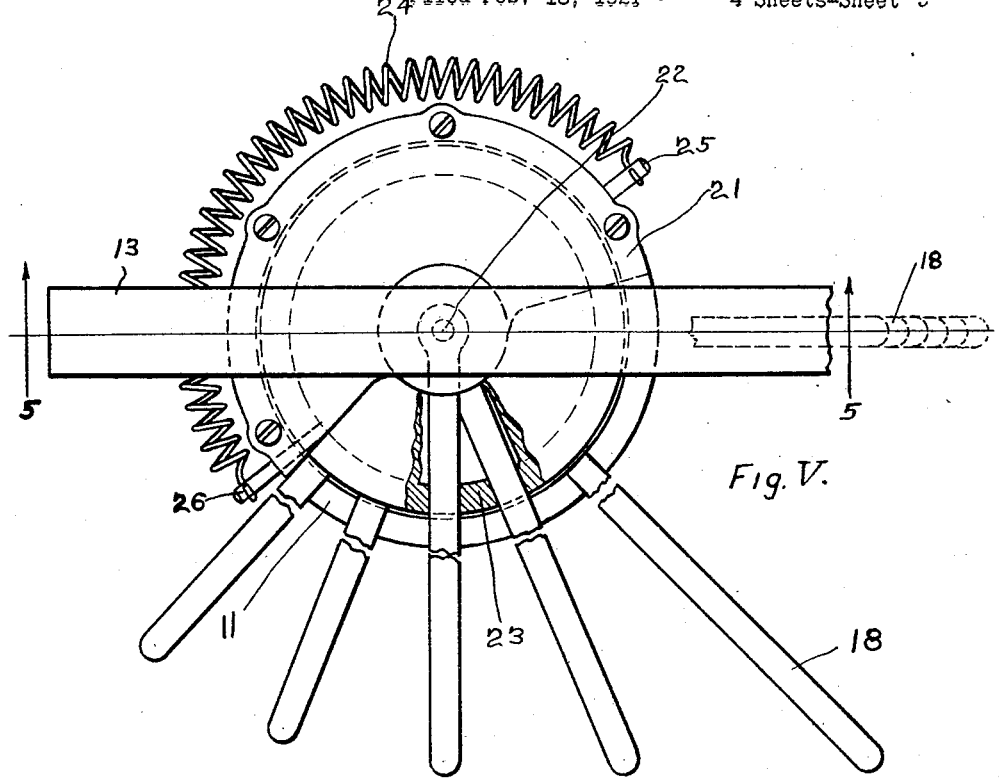
Fig. V.
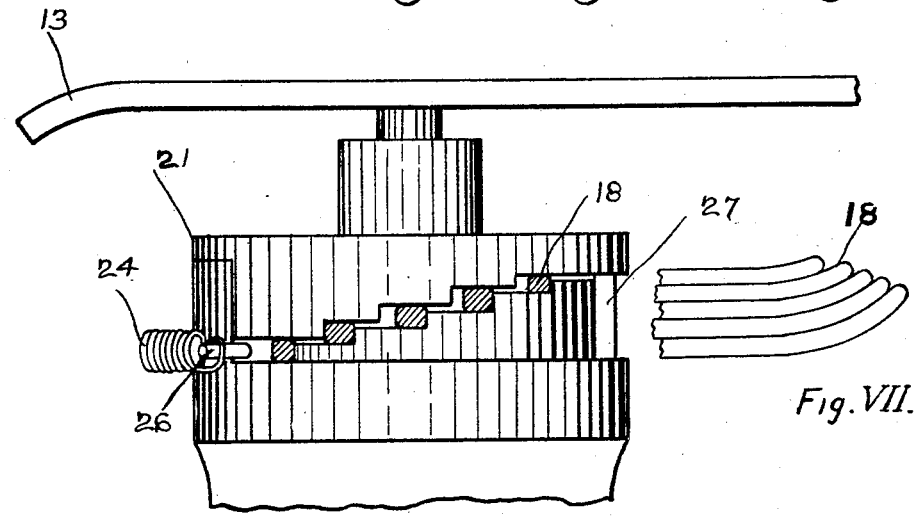
Fig. VI.
Fig. VII.
INVENTOR
Robert S. Blair

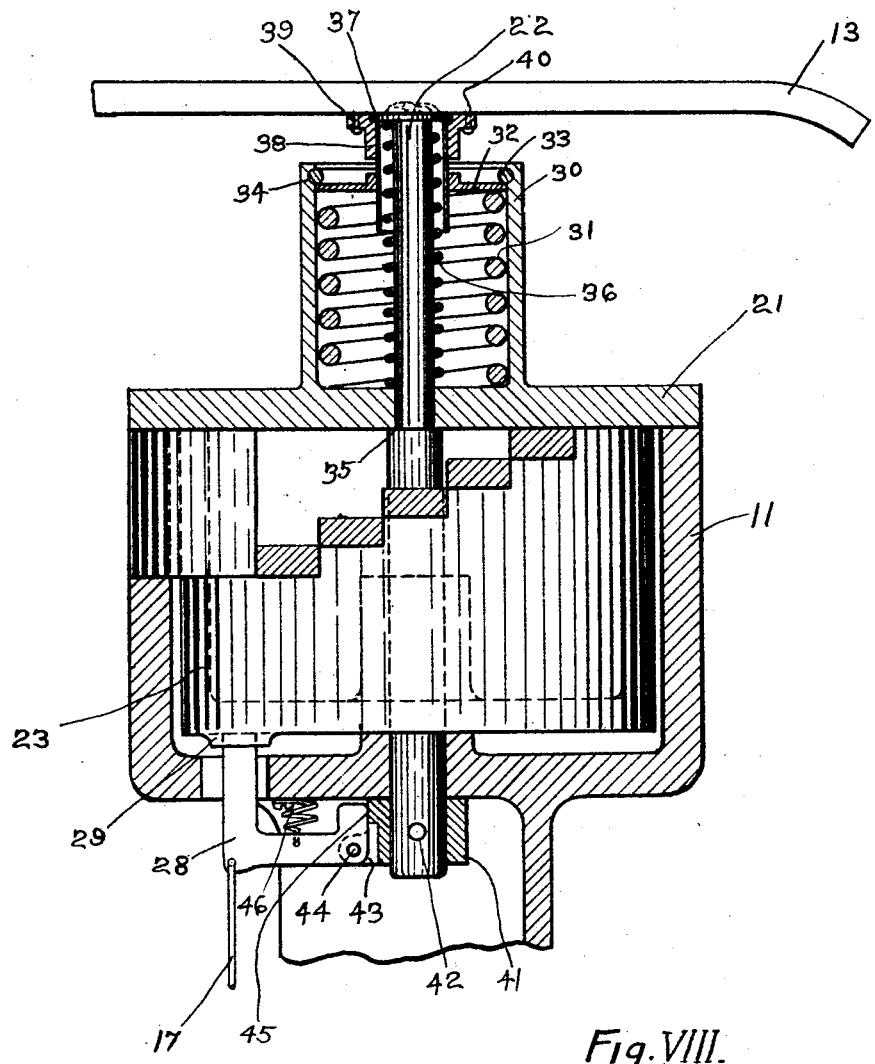
Fig. VIII.

Patented May 26, 1925.

1,539,540

UNITED STATES PATENT OFFICE.

ROBERT S. BLAIR, OF SOUND BEACH, CONNECTICUT.

FENDER FOR VEHICLES.

Application filed February 18, 1921. Serial No. 446,163.

*To all whom it may concern:*

Be it known that I, ROBERT S. BLAIR, a citizen of the United States, and resident of Sound Beach, in the county of Fairfield and State of Connecticut, have invented certain new and useful Improvements in Fenders for Vehicles, of which the following is a specification.

This invention relates to fenders for vehicles and with regard to certain features more particularly to fenders for motor vehicles.

One of the objects thereof is to provide a fender of simple and practical construction and reliable in action. Another object is to provide a mechanism not readily made inoperative by the elements or ice and mud. Another object is to provide a mechanism that will automatically extend itself and prevent an object which has been knocked over by the vehicle from being run over by the wheels. Another object is to provide a fender which will absorb the force of the blow upon striking an object and under favorable conditions throw the object from the path of the vehicle. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims:

Figure I is a diagrammatic plan view of a motor vehicle showing the fender mounted on a front portion of its frame and the linkage mechanism for operation of the fender. The fender leaves are shown in a retracted position.

Figure II is a diagrammatic side elevation of the motor vehicle chassis shown in Figure I.

Figure III is a plan view of one of the fender units showing the mode of attachment of the same to the frame of the motor vehicle.

Figure IV is a side elevation of Figure III looking from the center of the motor vehicle chassis towards the outside.

Figure V is a front elevation of the left hand unit of the fender with the leaves extended in the operating position, parts of the casing of the mechanism having been broken away to give a clear and unobstructed view of the interior arrangement of the mechanism.

Figure VI is a plan view of Figure V looking up towards the bottom.

Figure VII is a plan view looking up towards the bottom showing the leaves of the fender unit shown in Figure V in a retracted position.

Figure VIII is a cross sectional plan view along the line 5—5 in Figure V of the left hand fender unit looking upward along the fender leaves towards the bottom of the unit.

Similar reference characters refer to similar parts throughout in the several views of the drawings.

In Figure I a motor vehicle chassis 10 has attached to the forward ends of its frame the fender units 11 and 12 which are the same in construction and only one will be described as hereinafter pointed out and are connected by a bumper bar 13. A shaft 14 mounted on the frame of the motor vehicle chassis 10 has fixed to its ends the bell cranks 15 connected to the fender mechanism by the links 16 and 17 and a suitable foot lever 9 is fastened to the shaft 14 at some convenient point between the two bell cranks 15. The fender leaves 18 are shown in a retracted position, in which position they are all drawn up directly behind and in line with the bumper bar 13 as is more clearly shown in Figure II. Turning now to Figure III the casing of the left hand fender unit 11 is shown secured to the motor vehicle chassis frame 10 by bolts such as 19 and 20. The casing of the left hand fender unit 11 is so proportioned that it is of sufficient length that the fender leaves 18 will clear the front wheels of the motor vehicle whenever the leaves are extended and when the leaves are extended they will all lie in a plane approximately perpendicular to the surface or roadway upon which the motor vehicle is moving. Turning now to Figure V the cover plate 21 and the casing 11 of the right hand fender unit is shown broken away showing the fender leaves such as 18 at one end journaled about the fender spindle 22. The leaf actuating member 23 is likewise journaled on the fender spindle 22. This leaf extending member 23 has a series of steps cut in its edge as shown more clearly in Figure VI. The action of these steps is to progressively pick up the leaves, whenever the leaves are to be extended in the operating position, against similar steps cut in the cover plate 21 of the fender unit. The leaf actuating member 23 securely holds the leaves 18 against these steps in the cover plate 21 by virtue of the spring 24 which is fastened at one end of same to the pin 25 affixed in the fender unit casing 11 and at its other end is secured to the pin 26 driven into the leaf actuating member, this spring 24 tends at all times to hold the leaves 18 in an extended position as shown in Figure VI. At such time as when it is not desired to use the fender this leaf actuating member 23 is swung around to the limit in an anti-clockwise direction as determined by looking at Figure V until all the leaves such as 18 are brought up against the shoulder 27 on the fender unit casing 11, the spring 24 then being extended to a considerable extent and correspondingly exerting greater force tending to re-extend the leaves. The leaf actuating member 23 is held against the action of the spring 24 whenever it is desired to keep the leaves 18 in the retracted position as shown in Figure VII by the catch 28 as shown in Figure VIII which engages with a projection such as 29 on the leaf actuating member 23. Turning to Figure V the dotted outline of the nested leaves shows the position the leaves 18 assume when in the retracted position. The leaves 18 as shown in Figure VI are of substantially rectangular cross section and are curved at their extremities so that when they are in a retracted position they will nest upon each other as shown in Figure VII and the inherent springiness of the material of which they are made will cause them to press against each other and prevent any rattling or jar whenever the motor vehicle passes over rough ground. Turning now to the cross section in Figure VIII there is shown at 21 a cover plate having integral therewith a hollow cylindrical projection 30 containing a heavy coil spring 31 which is held in a condition of moderate contraction by a plate 32 pressing against it, plate 32 being in turn held in position by the spring ring 33 sprung into a groove 34 near the edge of the hollow cylindrical projection 30. Passing through the casing of the cover plate 21 and the fender unit casing 11 is the fender spindle 22 which is made with two different diameters, the shoulder formed where the smaller diameter joins the larger at 35 acts as a stop limiting the forward movement of the fender spindle 22 by coming up against the cover plate 21. A coil spring 36 loosely wound around the fender spindle 22 is confined in a state of compression by the flange 37 riveted on to the end of the fender spindle 22. This coil spring 36 at all times holds the fender spindle 22 in the limiting forward position, the shoulder 35 on the spindle being against the cover plate 21. A short tube 38 pressed into the flange 39 is concentrically fixed about the fender spindle 22 and the spring 36 and is riveted to the bumper bar 13 by the rivets such as 40. The flange 39 is provided at its outer end with a recess which encloses the flange 37 which is riveted on to the fender spindle 22 and consequently in view of its being riveted to the bumper bar 13 also secures the fender spindle 22 to the bumper bar. The tube 38 is in slidable connection with the plate 32. At the other extremity of the fender spindle 22 is the collar 41 pinned on to the fender spindle by the pin 42 and having a projection 43 upon which the catch 28 is mounted by the pin 44, the movement of the catch 28 towards the leaf actuating member 23 being limited by its coming up against the shoulder 45 on the collar 41. The catch 28 is normally held up against this shoulder 45 by the spiral tension spring 46 excepting at such times when it is desired to extend the fender leaves when the catch 28 is pulled out from engagement with shoulder 29 on the leaf actuating member 23 by means of the link 17 which connects with the foot lever 9 as shown in Figures I and II.

In ordinary usage the motor vehicle may be operated with the fender leaves 18 either in an extended position or a retracted position at the option of the driver of the motor vehicle, but it is probable that it would be most desirable to have the leaves in the retracted position at all times except when the motor vehicle is about to strike an object at which time the fender leaves can be very quickly extended by depressing the foot lever 9 which, referring to Figure VIII, will draw back the catch 28 by reason of the shaft 14 turning and the bell cranks 15 mounted thereon drawing back the catch 28 by means of the link 17. The leaf actuating member 23 now having been freed to act under the impulse of the spiral spring 24 shown in Figure V, by reason of the catch 28 clearing the projection 29 on the leaf actuating member 23, the leaf actuating member 23 will at once revolve about the shaft 22 in an anti-clockwise direction and extend the leaves into the emergency work position. The above account of the mode of operation of the fender is for the manner of operation of the same but in case there is no opportunity for the operator of the motor vehicle to depress the foot lever 9 by reason of lack of time or some other contingency the fender will by virtue of its construction automatically extend its leaves when the bumper bar 13 comes into contact with any object which may be in the path of the motor vehicle.

The automatic operation of the fender would be as follows:

Whenever the bumper bar 13 comes into contact with any object the bumper bar 13 will be forced towards the motor vehicle compressing the light spiral spring 36 and likewise carrying the fender spindle 22 along with it until the catch 28 which is fastened to the collar 41 clears the projection 29 on the leaf actuating member 23. Immediately upon the catch 28 clearing this projection 29, the leaf actuating member 23 will swing about in a clockwise direction under the impetus of the spring 24 as shown in Figure V until the leaves are brought up against the steps in the cover plate 21. These steps on the cover plate 21 with the fender leaves 18 securely held up against them by corresponding steps in the leaf actuating member 23, are clearly shown in Figure VI. By reason of the steps in the leaf actuating member 23 being arranged as shown in Figure VI the leaf actuating member 23 progressively picks up the leaves one by one from the position they are shown in Figure VII but they are all simultaneously brought up against the steps in the open position. These fender leaves 18 are of suitable length so that when being extended or after having been extended they will clear any moderate projection in the roadbed but at the same time will be of sufficient length to prevent any object or person which has been knocked down by the bumper bar 13 from passing under the wheels of the motor vehicle. It is desirable that these leaves be made of resilient and strong material so that there will be a tendency to throw the object with which the bumper bar 13 has been in collision, away from the vehicle thus affording an opportunity for the operator to arrest the forward motion of the vehicle. Returning to Figure VIII, it will be seen that if the obstruction encountered by the bumper bar 13 affords considerable resistance the bumper bar 13 will press the fender spindle 22 quite a distance and the flange 39 will ultimately come in contact with the cover plate 32 and the spring 31 will absorb the shock of the collision.

As various possible embodiments might be made of the above invention and as various changes might be made in the embodiment above set forth, it is to be understood that all matter herein set forth or shown in the accompanying drawings is to be interpreted as illustrative and not in a limiting sense.

Having described this invention, I claim:

1. A fender for vehicles comprising a plurality of members swiveled about a common axis adapted to assume a retracted position one over the other and to swing about said axis to an extended position before the wheels of the vehicle.

2. A fender for vehicles comprising a plurality of diverging radial elements forming a collapsible protective shield in front of the forward wheels of a vehicle.

3. A fender for vehicles comprising a pair of sectional collapsible protecting curtains mounted respectively before the forward wheels of a vehicle and adapted to swing transversely of the vehicle.

4. A fender for vehicles comprising a plurality of coaxial swinging members forming a collapsible shield mounted before the forward wheels and in combination with a bumper and means connecting said bumper and said fender adapted to automatically extend said fender upon said bumper coming into contact with an object.

5. A fender for vehicles comprising a series of leaves swiveled at one end about a common axis and so shaped to conform to each other as to permit their being swung around a common axis to the retracted position and nesting one above the other forming a relatively stable structure.

6. A fender for vehicles comprising a plurality of members swiveled about a common axis adapted to assume a retracted position one over the other and to swing about said axis to an extended position before the wheels of the vehicle, means adapted automatically to extend said members, and means adapted for manual operation thereof.

7. A fender for vehicles, comprising a series of resilient leaves swiveled about an axis at one end and means adapted to progressively extend or retract said series of resilient leaves.

8. A fender for vehicles comprising a bumper, a plurality of coaxial swinging members forming a fan-shaped extensible and retractable fender mounted before the forward wheels of a vehicle and means connecting said fender and said bumper.

9. A fender for vehicles comprising a bumper, a plurality of coaxial swinging members adapted to form a collapsible fan-shaped shield before each forward wheel of the vehicle, means connecting said shields and said bumper, and a resilient actuating member adapted to maintain said shields in extended position.

10. A fender for vehicles comprising a bumper, a plurality of coaxial swinging members adapted to form a collapsible fan-shaped shield before each forward wheel of the vehicle, a resilient actuating member adapted to maintain said shields in an extended position, and means connecting said shields and said bumper adapted to automatically extend said shields upon said bumper coming into contact with an object in the path of the vehicle.

11. A fender for vehicles comprising a bumper, a double fan-shaped extensible and retractable fender comprising a series of resilient leaves swiveled about a common axis at one end and shaped to conform to each other so that in the retracted position they nest one above the other forming a substantially rigid unit, and mounted before the forward wheels of a vehicle, a resilient actuating member adapted to main said fender in an extended position, means connecting said bumper and said fender adapted to cause automatic extension of said fender upon said bumper coming into contact with an object in the path of the vehicle.

12. A fender for vehicles comprising a bumper, a double fan-shaped extensible and retractable fender comprising a series of resilient leaves swiveled about a common axis at one end and shaped to conform to each other so that in the retracted position they nest one above the other forming a substantially rigid unit, and mounted before the forward wheels of a vehicle, means adapted for automatic and manual control of said fender, a resilient actuating member adapted to maintain said fender in an extended position, means connecting said bumper and said fender adapted to cause automatic extension of said fender upon said bumper coming into contact with an object in the path of the vehicle.

13. A fender for vehicles comprising a bumper, a double fan-shaped extensible and retractable fender comprising a series of resilient leaves swiveled about a common axis at one end and shaped to conform to each other so that in the retracted position they nest one above the other forming a substantially rigid unit, and mounted before the forward wheels of a vehicle, means adapted progressively to extend and retract said series of leaves, means adapted for automatic and manual control of said fender, a resilient actuating member adapted to maintain said fender in an extended position, means connecting said bumper and said fender adapted to cause automatic extension of said fender upon said bumper coming into contact with an object in the path of the vehicle.

14. A fender for vehicles comprising a plurality of members adapted collectively to form a substantially fan-shaped fender mounted transversely before the vehicle and adapted to move upwardly into retracted position.

15. A fender for vehicles comprising a plurality of swiveled members adapted to coact to form a substantially fan-shaped fender mounted transversely before the vehicle and adapted to swing upwardly into retracted position.

16. A fender for vehicles comprising a plurality of swiveled members adapted to assume a retracted position and to swing substantially transversely of the vehicle from said retracted position to collectively form a protective fender before the wheels.

17. A fender for vehicles comprising a plurality of members adapted to assume a retracted position in substantially overlapping relation and to move therefrom into extended position to collectively form a substantially fan-shaped fender transversely of the vehicle.

18. A fender for vehicles comprising a plurality of swinging members adapted to swing into diverging positions transversely of the vehicle and in advance thereof and means adapted to hold said fender in collapsed position when not in use.

19. A fender for vehicles comprising a plurality of swinging members of unequal length adapted to swing into diverging positions transversely of the vehicle and in advance thereof and means adapted to hold said members in collapsed relation when not in use.

Signed at Stamford in the county of Fairfield and State of Connecticut this 5th day of February A. D. 1921.

ROBERT S. BLAIR.